March 4, 1924.　　　　　P. R. G. BIEDERMANN　　　　　1,485,950
BELT CLAMP
Filed July 16, 1923
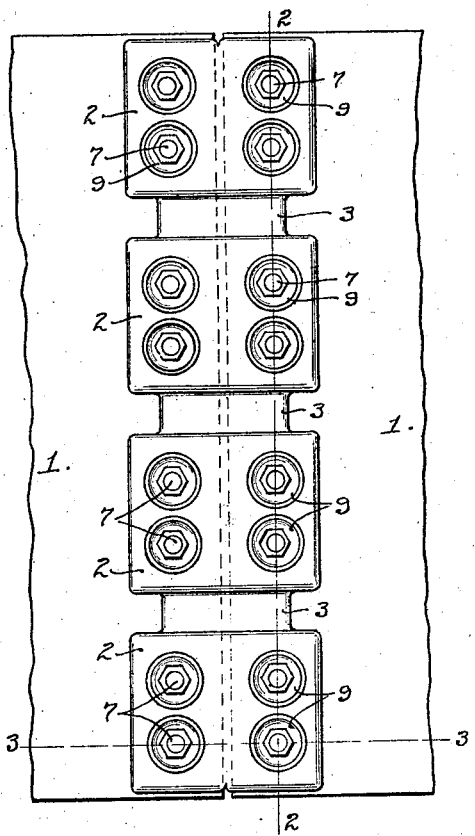
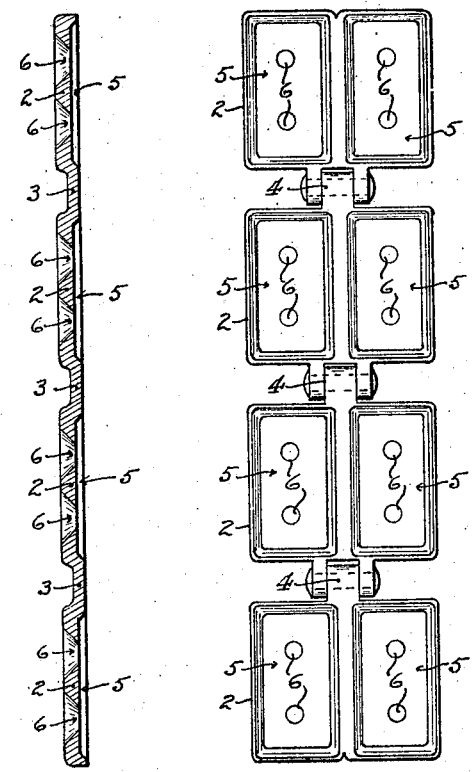
Fig. 1.　　　Fig. 2.　　　Fig. 4.
Fig. 3.
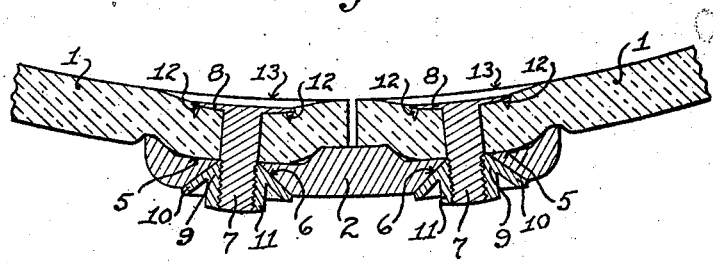
INVENTOR
Paul Robert George Biedermann
BY Booth & Booth
ATTORNEYS Patented Mar. 4, 1924.

1,485,950

UNITED STATES PATENT OFFICE.

PAUL ROBERT GEORGE BIEDERMANN, OF TAFT, CALIFORNIA.

BELT CLAMP.

Application filed July 16, 1923. Serial No. 651,702.

*To all whom it may concern:*

Be it known that I, PAUL ROBERT GEORGE BIEDERMANN, a citizen of the United States, residing at Taft, in the county of Kern and State of California, have invented certain new and useful Improvements in Belt Clamps, of which the following is a specification.

My invention relates to clamping devices for connecting together the adjacent ends of power transmitting belts.

The principal object of my invention is to provide a belt clamp which is simple and cheap to manufacture, which may be applied quickly and easily, and which will function successfully without wear either upon itself or upon the belt to which it is applied. Other objects and advantages of the invention will become apparent from the following description when read with reference to the accompanying drawings, wherein:—

Fig. 1 is a plan view of the back or outside of a preferred form of my clamp, showing it applied to a belt.

Fig. 2 is a section parallel to the major axis of my clamp, taken on the line 2—2 of Fig. 1, the belt and the securing bolts being omitted.

Fig. 3 is a transverse section, taken on the line 3—3 of Fig. 1 and enlarged.

Fig. 4 is a plan view of the belt-receiving face or inside of a slightly modified form of my clasp.

In the drawings, the reference numerals 1 designate the adjacent ends of the belt. My clamp comprises a plurality of similar sections or body members 2 extending in a series across the width of the belt, and joined together by connecting members which are adapted for flexing to a sufficient degree to conform to the crown of the pulleys over which the belt runs. In Figs. 1 and 2 I have shown these connecting members as relatively narrow and thin necks 3 formed integrally with the body sections 2; whereas in Fig. 4 they are shown as hinged joints 4. The latter form is, of course, adapted for greater flexing than the former, and is therefore preferred in cases where the crown of the pulleys is excessive. The integral form shown in Figs. 1 and 2, however, is suitable for all ordinary uses, the clamp being made of some material, such for example as malleable iron, annealed cast steel, or pressed steel, which will permit the necessary flexing of the connecting necks 3.

The number of body sections employed is immaterial, and depends on the width of the belt and the crown of the pulleys. Obviously, the greater the number of sections, the greater the flexibility of the clamp. In practice I have found a four-section clamp to be satisfactory on a twelve inch belt.

Each body section 2 is provided on its inner side or belt-receiving face with a pair of rectangular depressions 5, Figs. 2, 3 and 4, one positioned on each side of the major axis of the clamp, and each occupying approximately the semi-area of the section, the entire belt receiving face of the clamp being smooth and devoid of teeth or prongs to engage the belt. Each section 2 is also provided with bolt holes 6. The number of such bolt holes is immaterial, but I prefer to employ four in each section 2, two positioned in each depression 5, as shown in Fig. 4. Through each such hole 6 is passed a bolt 7, Fig. 3, said bolt also passing through the belt 1, and having a relatively thin flat head 8 adapted to lie flush with or slightly below the inner face of said belt. Nuts 9 are screwed upon the outer ends of said bolts, thereby clamping the belt and clamp firmly together. Said nuts may be of any convenient form, but I prefer to make them with conical bearing faces 10, adapted to seat in the counter-sunk bolt holes 6, and hexagonal central portions 11 adapted to receive a socket wrench. This construction gives the necessary strength, without causing the nuts and bolt ends to project much beyond the back of the clamp to constitute a source of danger. The bolts 7 are preferably provided with some suitable means to keep them from turning, such for example as prongs 12 projecting inwardly from the heads 8, and adapted to embed themselves in the belt.

When the bolts are set up tight, the belt is drawn into the depressions 5 of the clamp, as shown in a somewhat exaggerated manner in Fig. 3. This not only allows the heads 8 of the bolts to be drawn down flush with or slightly below the working face of the belt, but also very greatly increases the frictional contact between the back or outer surface of the belt and the clamp. This frictional contact in fact, takes the major portion of the strain, thereby relieving the bolts of practically all shearing strains and obviating the danger of the holes in the belt pulling out. On account of the relatively large combined area of the depressions 5, and of their rectangular shape this frictional effect is rendered very great. At the same time, those portions of the belt which lie over the transverse rises, between said depressions provide an even surface, as shown at 13 in Fig. 3, to enable the belt to run smoothly over the pulleys.

On account of their number, the bolts 7 can be made relatively small in diameter, so that the holes do not weaken the belt. With a rubber and fabric belt of the usual type, the holes may be made with an awl or marlin spike, thus avoiding cutting any of the strands of the belt fabric, said strands being merely forced apart by the punching tool.

My clamp is preferably formed with a slight curvature in the direction of its minor axis, as shown in Fig. 3, to enable it to conform approximately to the curvature of the pulleys over which the belt runs. On account of the narrow width of the clamp, any given curvature will operate smoothly over a wide range of pulley diameters. For example, it has been found in practice that a clamp with an eighteen inch curvature will run smoothly over pulleys whose diameters range from ten inches, to ten feet.

It is noteworthy that my clamp is very simple to apply. The only tools needed are an awl to punch the holes in the belt and a wrench to tighten the nuts, and on account of the shape of the device and its method of attachment, it can be properly and quickly applied by anyone at all familiar with the use of the simple tools mentioned, without any expert knowledge of the art of handling belts. Furthermore, there are no sharp edges or fangs or teeth to cut or injure the belt, nor does the belt have to be bent at a sharp angle.

On account of the firm connections between the several body sections 2, whether said connections are formed by the integral necks 3 or the hinge joints 4, the strain is evenly distributed throughout the entire clamp, and each part bears its proper share of the load. Moreover, my clamp is exceedingly light in proportion to its strength, so that no undue strain is put upon the belt by reason of the weight of the clamp.

I claim:—

1. A belt-clamp comprising an elongated member having a plurality of longitudinally aligned sections, each section having a smooth belt receiving face with a rectangular depression on each side of the major axis of said member said depression occupying approximately the semi area of the section; and bolts associated with said member for forcing the belt into frictional engagement with said depressions.

2. A belt clamp comprising an elongated member having a plurality of longitudinally aligned sections and adapted for flexing on lines between said sections, each section having a smooth belt receiving face with a rectangular depression on each side of the major axis of said member said depression occupying approximately the semi area of the section; and bolts associated with said member for forcing the belt into frictional engagement with said depressions.

3. A belt-clamp comprising an elongated member having a plurality of longitudinally aligned sections hinged together, each section having a smooth belt receiving face with a rectangular depression on each side of the major axis of said member said depression occupying approximately the semi area of the section; and bolts associated with said member for forcing the belt into frictional engagement with said depressions.

In testimony whereof I have signed my name to this specification.

PAUL ROBERT GEORGE BIEDERMANN.